US012601809B2

(12) United States Patent
Dong

(10) Patent No.: US 12,601,809 B2
(45) Date of Patent: Apr. 14, 2026

(54) POSITIONING METHOD AND APPARATUS

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 685 days.

(21) Appl. No.: 17/910,729

(22) PCT Filed: Mar. 13, 2020

(86) PCT No.: PCT/CN2020/079362
§ 371 (c)(1),
(2) Date: Sep. 9, 2022

(87) PCT Pub. No.: WO2021/179326
PCT Pub. Date: Sep. 16, 2021

(65) Prior Publication Data
US 2023/0148057 A1     May 11, 2023

(51) Int. Cl.
*H04L 1/00* (2006.01)
*G01S 5/00* (2006.01)
*G01S 5/02* (2010.01)
*H04W 76/20* (2018.01)
*H04W 76/30* (2018.01)

(52) U.S. Cl.
CPC .......... *G01S 5/0063* (2013.01); *G01S 5/0236* (2013.01); *H04W 76/20* (2018.02); *H04W 76/30* (2018.02)

(58) Field of Classification Search
CPC .... G01S 5/0063; G01S 5/0236; G01S 5/0205; H04W 76/20; H04W 76/30; H04W 24/10; H04W 60/06; H04W 64/00; H04W 76/27; H04W 72/231; Y02D 30/70
USPC ...................................................... 455/456.1
See application file for complete search history.

(56) References Cited

U.S. PATENT DOCUMENTS

2020/0314700 A1* 10/2020 Da Silva ............... H04W 76/27

FOREIGN PATENT DOCUMENTS

CN       102860063 A  *  1/2013 ............ H04W 24/10
EP       2360962 A2      8/2011

OTHER PUBLICATIONS

PCT/CN2020/079362 English translation of International Search Report dated Nov. 18, 2020, 2 pages.
European Patent Application No. 20924435.9, Search and Opinion dated Oct. 27, 2023, 9 pages.

* cited by examiner

*Primary Examiner* — Tanmay K Shah
(74) *Attorney, Agent, or Firm* — Cozen O'Connor

(57) ABSTRACT

A positioning method in a 5G cellular network includes a UE receiving a radio resource control (RRC) release message, the RRC release message carrying positioning assistance information. The positioning assistance information is used to perform positioning measurement to obtain a positioning result when the UE is in an RRC non-connected state; and the RRC non-connected state includes an RRC idle state and an RRC inactive state.

12 Claims, 6 Drawing Sheets

| UE | | LMF |
|---|---|---| sending the positioning assistance information based on LPP (LPP provide assistance data)

POSITIONING METHOD AND APPARATUS

CROSS-REFERENCE TO RELATED APPLICATION

This application is the US national phase application of International Application No. PCT/CN2020/079362, filed on Mar. 13, 2020, the entire contents of which are incorporated herein by reference.

TECHNICAL FIELD

The disclosure relates to but is not limited to the field of wireless communication technologies, and in particular to a positioning method, a positioning apparatus, a communication device and a storage medium.

BACKGROUND

The 5th Generation (5G) cellular mobile communication R16 introduces a variety of positioning technologies, which can realize positioning of User Equipment (UE) in a radio resource control (RRC) connected state. For some of the positioning technologies, a Location Management Function (LMF) is required to provide the UE with positioning assistance information. Here, LMF is a communication entity.

In order to save energy consumption of the UE and reduce positioning delay, 5G proposes the requirements for positioning the UE in the RRC idle state or the RRC inactive state. For the UE in the RRC connected state, since the LMF can determine a serving cell of the UE, the LMF sends the positioning assistance information to the UE through a Long term evolution Position Protocol (LPP) message. In detail, a serving base station of the UE sends the positioning assistance information to the UE through the RRC message through pass-through. In addition, the LMF may send the positioning assistance information to the base station through a New Radio Positioning Protocol a (NRPPa) message, and then the base station sends the positioning assistance information to the UE in a system message through broadcasting.

For the UE in the RRC idle state or the RRC inactive state, the LMF cannot send the positioning assistance information to the UE through the LPP message. The UE in the RRC idle state or the RRC inactive state can obtain the positioning assistance information by obtaining the system message or actively requesting a positioning system message. Therefore, in order to send the positioning assistance information to the UE in the RRC idle state or the RRC inactive state, the system overhead will be increased, and positioning delay may occur.

However, it is worth noting that the positioning assistance information is obtained through the system message or actively requesting the positioning system message, so that the wireless system has the problems of large system overhead and significant positioning delay.

SUMMARY

Embodiments of a first aspect of the disclosure provide a positioning method, applied to a UE. The method includes:

receiving a RRC release message, in which the RRC release message carries positioning assistance information, the positioning assistance information is configured to perform positioning measurement to obtain a positioning result when the UE is in an RRC non-connected state, and the RRC non-connected state includes an RRC idle state and an RRC inactive state.

Embodiments of a second aspect of the disclosure provide a positioning method, applied to a base station. The method includes:

sending a RRC release message, in which the RRC release message carries positioning assistance information, the positioning assistance information is configured to perform positioning measurement when a UE is in an RRC non-connected state, and the RRC non-connected state includes an RRC idle state and an RRC inactive state.

Embodiments of a third aspect of the disclosure provide a communication device, including a processor, a transceiver, a memory, and executable programs stored on the memory and capable of being executed by the processor. When the processor runs the executable programs, the positioning method provided by any technical solution of the first aspect or the second aspect of the disclosure is implemented. It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the word "if" as used herein can be interpreted as "when", "while" or "in response to determining".

Figure 1:
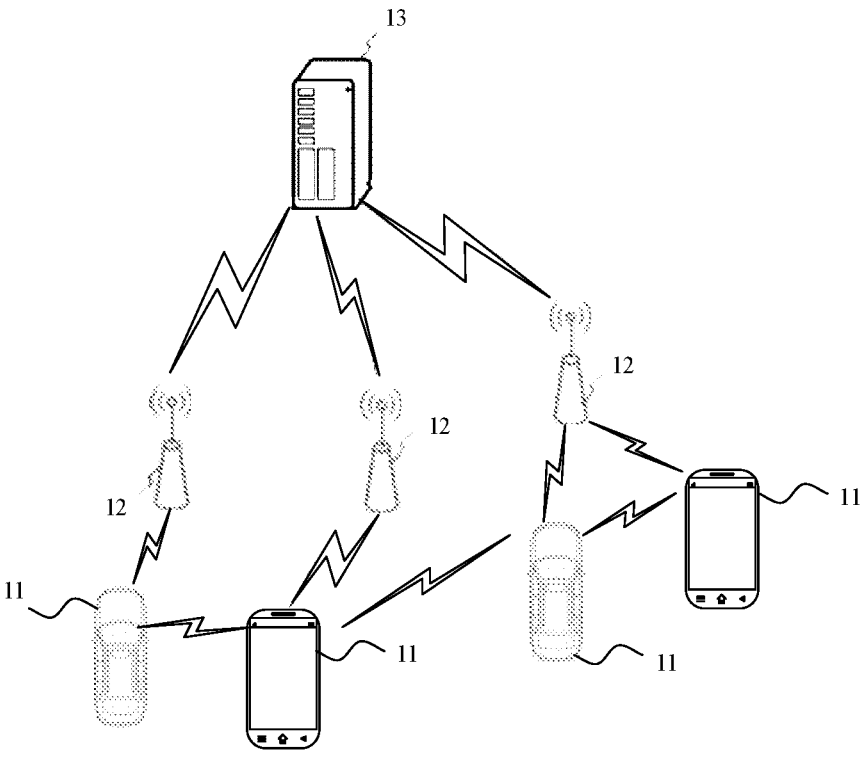
FIG. 1 is a schematic diagram of a wireless communication system according to an exemplary embodiment.

FIG. 1 shows a schematic diagram of a wireless communication system according to an embodiment of the disclosure. As illustrated in FIG. 1, the wireless communication system is a communication system based on cellular mobile communication technology, and the wireless communication system may include several terminals 11 and several base stations 12.

The terminal 11 may be a device that provides voice and/or data connectivity to a user. The terminal 11 may communicate with one or more core networks via a Radio Access Network (RAN). The terminal 11 may be an IoT terminal such as a sensor device, a mobile phone (or "cellular" phone) and a computer with the IoT terminal. The terminal 11 may be a fixed, portable, pocket, hand-held, built-in computer or a vehicle-mounted device, for example, a Station (STA), a subscriber unit, a subscriber station, a mobile station, a mobile, a remote station, an access point, a remote terminal, an access terminal, a user terminal, a user agent, a user device, or a UE. Alternatively, the terminal 11 may also be a device of an unmanned aerial vehicle. Alternatively, the terminal 11 may also be a vehicle-mounted device, for example, an Engine Control Unit (ECU) with a wireless communication function, or a wireless communication device externally connected to the ECU. Alternatively, the terminal 11 may also be a roadside device, for example, a street light, a signal light, or other roadside devices with a wireless communication function.

The base station 12 may be a network-side device in a wireless communication system. The wireless communication system may be the 4th generation (4G) mobile communication system, also known as a Long Term Evolution (LTE) system. Or, the wireless communication system may also be a 5G system, also known as a New Radio (NR) system or 5G NR system. Alternatively, the wireless communication system may also be a next-generation system of the 5G system. The access network in the 5G system may be called New Generation-Radio Access Network (NG-RAN), or the MTC system.

The base station 12 may be an evolved base station (eNB) employed in the 4G system. Alternatively, the base station 12 may also be a base station (gNB) that adopts a centralized-distributed architecture in the 5G system. When the base station 12 adopts a centralized distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer. A physical (PHY) layer protocol stack is set in the DU, and the specific implementation manner of the base station 12 is not limited in this embodiment of the disclosure.

A wireless connection can be established between the base station 12 and the terminal 11 through a radio air interface. In different embodiments, the radio air interface is a radio air interface based on the 4G mobile communication network technology standard. Or, the radio air interface is a radio air interface based on the 5G mobile communication network technology standard, for example, the radio air interface is a NR. Alternatively, the radio air interface may also be a radio air interface based on a next generation of 5G mobile communication network technology standard.

In some embodiments, an End to End (E2E) connection may also be established between the terminals 11, for example, scenes of vehicle to vehicle (V2V) communication, Vehicle to Infrastructure (V2I) communication and Vehicle to Pedestrian (V2P) communication in Vehicle to everything (V2X) communication.

In some embodiments, the above wireless communication system may further include a network management device 13.

Several base stations 12 are connected to the network management device 13 respectively. The network management device 13 may be a core network device in the wireless communication system, for example, the network management device 13 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) or a Home Subscriber Server (HSS). The implementation form of the network management device 13 is not limited in this embodiment of the disclosure.

Figure 2:
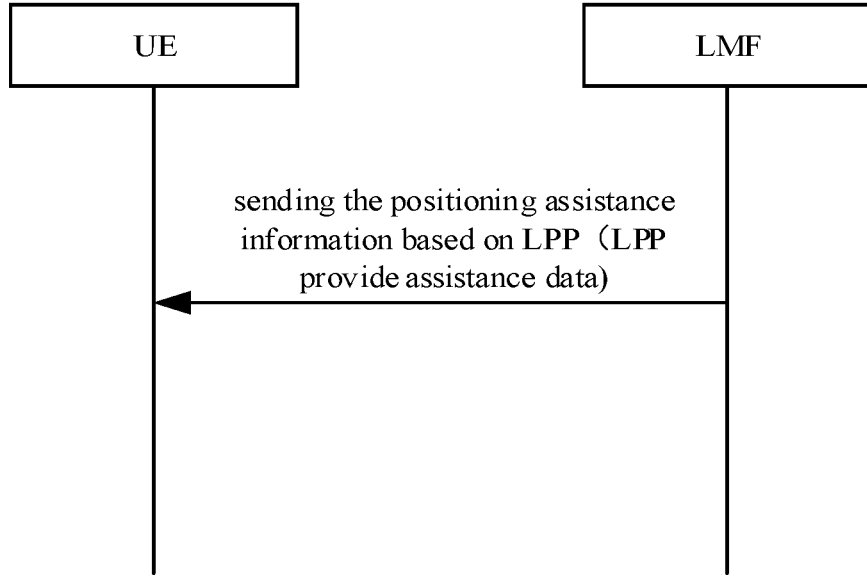
FIG. 2 is a flowchart of a positioning method according to an exemplary embodiment.

FIG. 2 is a schematic diagram of an LMF sending positioning assistance information to a terminal based on LPP. For example, the LMF may transmit the positioning assistance information to the UE via the base station through pass-through.

Figure 3A:
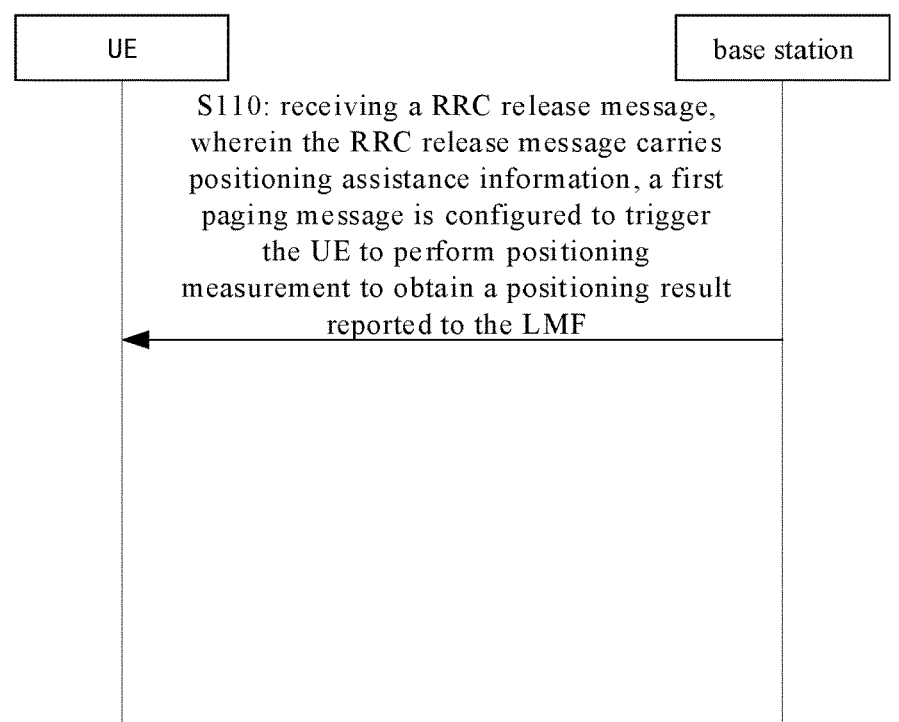
FIG. 3A is a flowchart of a positioning method according to an exemplary embodiment.

As illustrated in FIG. 3A, this embodiment provides a positioning method, applied to a UE. The method includes:

S110, receiving a RRC release message, in which the RRC release message carries positioning assistance information, the positioning assistance information is configured to perform positioning measurement to obtain a positioning result when the UE is in an RRC non-connected state, and the RRC non-connected state includes an RRC idle state and an RRC inactive state.

When the UE is in the RRC non-connected state, the UE may or may not receive a positioning request. However, if the UE receives the positioning request when the UE is in the RRC non-connected state, positioning can be performed based on the positioning assistance information to obtain the positioning result.

Figure 3B:
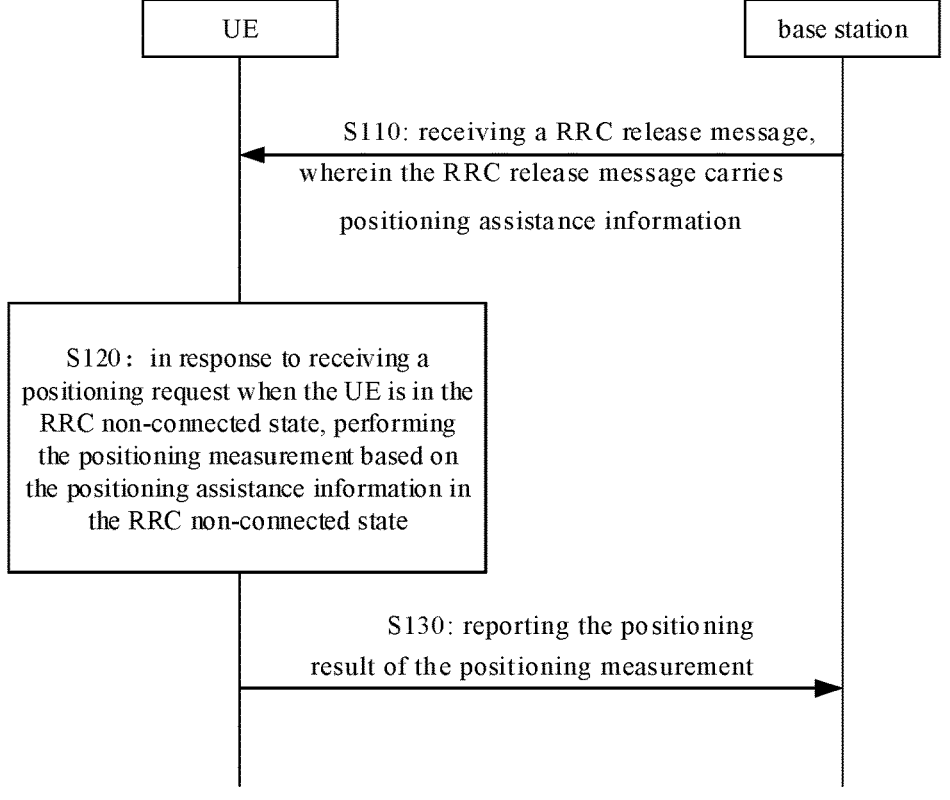
FIG. 3B is a flowchart of a positioning method according to an exemplary embodiment.

Therefore, as shown in FIG. 3B, in some embodiments, the method further includes:

S120, in response to receiving a positioning request when the UE is in the RRC non-connected state, performing the positioning measurement based on the positioning assistance information in the RRC non-connected state, in which the RRC non-connected state includes the RRC idle state and the RRC inactive state; and S130, reporting a positioning result of the positioning measurement.

In embodiments of the disclosure, the UE may be various terminals that can be connected to the base station, and the UE includes but is not limited to at least one of a mobile phone, a tablet, an in-vehicle device, an industrial device, a wearable device, and a medical device.

In embodiments of the disclosure, before the UE switches from the RRC connected state to the RRC non-connected state such as the RRC idle state or the RRC inactive state, the UE will receive the RRC release message sent by the base station.

In this embodiment of the disclosure, the RRC release message carries the positioning assistance information.

The positioning assistance information may be sent by the LMF to the base station based on the NRPPa protocol and temporarily stored by the base station, and carried in the RRC release message before the base station finds that the UE switches from the RRC connected state to the RRC non-connected state. When the UE enters the RRC non-connected state such as the RRC idle state or the RRC inactive state, it receives the positioning assistance information from the RRC release message, and thus the UE does not need to intentionally receive the positioning assistance from the system message or the request-based system message, thereby reducing the signaling overhead. Meanwhile, when the UE is in the RRC non-connected state, once a positioning request is received, the UE can directly perform the positioning measurement based on the positioning assistance information received in the RRC release message in the RRC non-connected state, so as to obtain the positioning result, and report the positioning result to the base station in the RRC non-connected state. In this way, the UE does not need to switch to the RRC connected state, and then obtain the positioning assistance information required for the positioning measurement by receiving the system message sent by the base station or the request-based system message, thereby reducing the positioning delay and improving the positioning rate. Furthermore, the UE does not need to switch from the RRC non-connected state to the RRC connected state with high energy consumption only for the positioning measurement, thereby reducing the unnecessary long time that the UE is in the RRC connected state, thereby saving the power consumption of the UE and reducing power consumption caused by the UE frequently switching between RRC disconnected state and RRC connected state.

The positioning assistance information includes:

a cell identifier of the positioning measurement and/or a base station identifier of the positioning measurement; and resource location information of a positioning reference signal for the positioning measurement.

In some embodiments, the cell identifier may be an identifier of a serving cell where the UE stays last or an identifier of a neighbor cell of the serving cell where the UE stays last.

In other embodiments, the base station identifier may be: an identifier of a base station of the serving cell where the UE stays last, or an identifier of a base station of the neighboring cell of the serving cell where the UE stays last.

Based on the cell identifier and/or the base station identifier, the terminal can know the measurement object. When performing the positioning measurement, the positioning reference signals (PRS) sent by the cell or the base station is measured. Therefore, when the terminal performs the positioning measurement, it needs to know the resource location information of the PRS. The resource location information indicates time-frequency resource for sending the PRS.

In some embodiments, when the UE is in the RRC non-connected state, the UE will answer the paging message at paging, and the positioning request may be carried in the paging message.

In some embodiments, after receiving the paging message carrying the positioning request, the UE does not directly return a paging response, but performs the positioning measurement based on the positioning request, and reports the paging response carrying the positioning result to the base station after obtaining the positioning result. Meanwhile, the base station may transmit the received paging response to the LMF through the pass-through, or may extract the positioning result in the paging response and forward it to the LMF.

In other embodiments, the UE initiates random access after receiving the paging message carrying the positioning request, and reports the positioning result during the random access process. Once the reporting of the positioning result is completed, the random access is ended, so that the UE remains in the RRC non-connected state. For example, the positioning result is reported in a random access request. When the base station receives the random access request carrying the positioning result, the base station may determine that the main purpose of the current random access request is to report the positioning result, and the subsequent random access process can be ended. Certainly, after receiving the random access request including the positioning result, the base station can send a confirmation notification to the UE through the random access response. After receiving the confirmation notification, the UE ends the random access process, so that the UE remains in the RRC non-connected state.

The positioning result includes: a measurement value of the PRS obtained by the UE; and/or position information of the UE determined by the UE based on the measurement value of the PRS.

The measurement value of the PRS includes, but is not limited to: a receiving power of the PRS and/or a reference signal time difference.

In some embodiments, S120 may include: in response to receiving a valid positioning request when the UE is in the RRC non-connected state, performing the positioning measurement in the RRC non-connected state.

Figure 4:
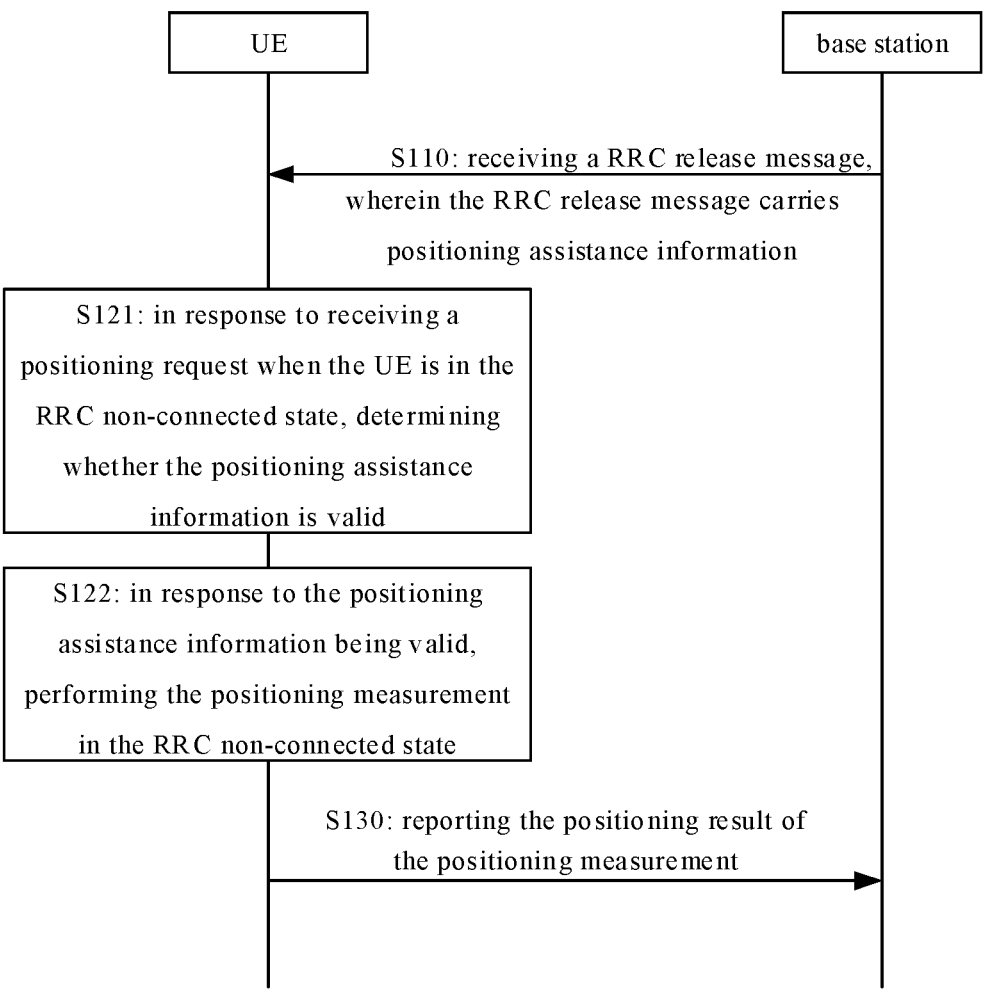
FIG. 4 is a flowchart of a positioning method according to an exemplary embodiment.

For example, as illustrated in FIG. 4, S120 may include:

S121, in response to receiving a positioning request when the UE is in the RRC non-connected state, determining whether the positioning assistance information is valid;

S122, in response to the positioning assistance information being valid, performing the positioning measurement in the RRC non-connected state.

In embodiments of the disclosure, it will be further determined whether the positioning assistance information is still valid when the UE receives the positioning request in the RRC non-connected state. If the positioning assistance information is still valid, it means that the positioning measurement performed based on the positioning assistance information (for example, one or more positioning configurations of the positioning measurement mode, the measurement parameters of the positioning measurement, and the quality of service) can provide the positioning measurement required by the LMF, and obtain the positioning result that meets the requirements of the LMF.

In embodiments of the disclosure, after receiving the positioning request, the UE does not perform the positioning measurement based on it immediately, but firstly determines whether the positioning assistance information is valid. If the positioning assistance information received by the UE from the RRC release message is still valid, the positioning measurement will be performed in the RRC non-connected state based on the positioning assistance information currently stored in the UE.

In some embodiments, determining the valid time range of the positioning assistance information includes:

in response to receiving the positioning request when the UE is in the RRC non-connected state, determining that the positioning assistance information is valid if a timer for timing the valid time range is not timed out; or, determining that the positioning assistance information is invalid if the timer is timed out.

For example, S122 further includes:

in response to receiving the positioning request when the UE is in the RRC non-connected state, determining whether a current time is within the valid time range of the positioning assistance information;

and/or in response to receiving the positioning request when the UE is in the RRC non-connected state, determining whether the UE is located within a valid space range of the positioning assistance information.

There may be various aspects to determine whether the positioning assistance information is valid. The above provides an effective determination method based on time and an effective determination method based on space.

In an embodiment, it is determined whether the current time when the positioning request is received is within the valid time range of the positioning assistance information, if the current time is within the valid time range, the positioning assistance information is valid, otherwise the positioning assistance information is invalid.

In an embodiment, when the positioning request is received, it is determined whether the UE is currently within the valid space range of the positioning assistance information. For example, whether the cell where the UE currently resides belongs to one or more cells affected by the positioning assistance information. For another example, it is determined whether latitude and longitude of the current space location of the UE is within the valid space range of the positioning assistance information.

In some embodiments, in response to receiving the positioning request when the UE is in the RRC non-connected state, determining whether the current time is within the valid time range of the positioning assistance information includes:

in response to receiving the positioning request when the UE is in the RRC non-connected state, determining whether a timer for timing the valid time range at the current time is timed out; and in response to the timer being not timed out, determining that the positioning assistance information is valid.

In other embodiments, in response to receiving the positioning request when the UE is in the RRC non-connected state, determining whether the current time is within the valid time range of the positioning assistance information includes: in response to the timer being timed out, determining that the positioning assistance information is invalid.

After receiving the RRC release message, the UE may configure a timer, the timer starts timing, and a timing duration of the timer is a duration corresponding to the valid time range. In this way, when the positioning request is received, it can be determined whether the timer is timed out at the receiving time of the positioning request.

If the timer has timed out, it means that the current time is an invalid time beyond the valid time range of the positioning assistance information, that is, the positioning assistance information is invalid. If the timer has not timed out, it means that the current time is a valid time within the valid time range of the positioning assistance information, that is, the positioning assistance information is valid.

It is an executable way to distinguish the valid time and the invalid time based on the valid time range of the timer.

In other embodiments, the start time and end time of the valid time range may be calibrated by the world time. In this way, at the current time when the positioning request is received, it will be determined whether the current time is within the valid time range according to the world time recorded by the terminal, and the terminal does not need to set an additional timer.

In conclusion, there are many ways to determine whether the current time is within the valid time range, and the specific implementation is not limited to any one of the above.

In some embodiments, determining the valid space range of the positioning assistance information includes:

in response to receiving the positioning request when the UE is in the RRC non-connected state, determining that the positioning assistance information is valid if a cell where the UE resides is a cell within the valid space range; or, determining that the positioning assistance information is invalid if the cell where the UE resides is not within the valid space range.

For example, in response to receiving the positioning request when the UE is in the RRC non-connected state, determining whether the UE is located within the valid space range of the positioning assistance information includes:

in response to receiving the positioning request when the UE is in the RRC non-connected state, determining whether the cell where the UE resides is located within the valid space range; and in response to the cell where the UE resides being a cell within the valid space range, determining that the positioning assistance information is valid.

In another embodiment, in response to receiving the positioning request when the UE is in the RRC non-connected state, determining whether the UE is located within the valid space range of the positioning assistance information includes:

in response to the cell where the UE resides being not in the valid space range, determining that the positioning assistance information is invalid.

The valid space range may be a geographical area range circled by geographic indication information such as longitude and latitude, or a network area range composed by means of cells of a wireless network. For example, valid cells or a valid cell set is set for the positioning assistance information. The network area range corresponding to the valid cells or the cells in the valid cell set constitutes the valid space range. For example, the valid space range may be indicated by a cell Identity (ID) in a cell ID list.

If the cell where the UE currently resides is a valid cell of the positioning assistance information or a cell in the valid cell set, it may be considered that the positioning assistance information is valid at least in the spatial dimension.

For example, when the UE determines whether the positioning assistance information is valid, it is determined whether its current location is located in the valid space range of the positioning assistance information according to the cell where it resides, or the latitude and longitude information obtained through the Global Positioning System (GPS) or Beidou satellite positioning.

By setting the valid time range and/or the valid space range of the positioning assistance information, it is possible to realize the positioning measurement adapted to the corresponding time and space in different time and/or space ranges.

In some embodiments, the positioning assistance information includes at least one of the followings:

measurement configuration of PRS for performing the positioning measurement;

cell public parameter configuration for performing the positioning measurement;

valid time range indication information configured to indicate the valid time range of the positioning assistance information; and valid space range indication information configured to indicate the valid space range of the positioning assistance information.

The resource location of the PRS is added to the positioning assistance information, so that the UE can measure the PRS at the corresponding time domain resource and/or resource location to realize the positioning measurement.

The common channel of the cell includes but is not limited to: a broadcast channel of the cell, a common physical downlink control channel, and the like. The cell to be measured for the positioning measurement may be a cell where the UE currently resides, or may be a neighboring cell of the cell where the UE currently resides.

The common channel configuration at least indicates the resource location of the common channel, so that the UE can receive the configuration for the positioning measurement at the corresponding resource location, for example, the positioning measurement configuration and/or the measurement configuration of the PRS described above.

The positioning measurement configuration includes but is not limited to at least one of the followings.

a positioning mode, including but not limited to: Downlink-Time Difference of Arrival (DL-TDOA) mode, UPlink-Time Difference of Arrival (UL-TDOA) mode, Downlink-Arrival of Angle (DL-AOA) mode and Enhanced Cell-IDentity positioning method (E-CID);

measurement parameters of the positioning measurement, including but not limited to: Position Reference Signals-Reference Signal Receiving Power (PRS-RSRP) and Position Reference Signals-Reference Signal Time Difference (PRS-RSTD);

Quality of Service (QoS) requirements including positioning accuracy and/or positioning delay; and identifiers of the UE performing the positioning measurement, for example, the International Mobile Subscriber Identification Number (IMSI) or Temporary Mobile Subscriber Identity (TMSI) of the UE, in which the UE identifier can inform the base station of forwarding the positioning request to which UE, or needing to send the positioning request through a paging message.

The positioning measurement based on the above positioning assistance information can ensure that the UE performs the positioning measurement according to the positioning mode, the positioning accuracy and/or positioning service quality required by the LMF, and reports the positioning result expected by the LMF.

Certainly, the above is just an example, and the specific implementation is not limited to any one of the above.

The valid time range indication information indicates the valid time range corresponding to the positioning assistance information, for example, indicates the timing duration of the aforementioned timer.

The valid space range indication information indicates the valid space of the positioning assistance information. For example, the valid space range indication information includes a cell list. The cell range indicated by the cell identifiers included in the cell list is the valid space range.

In some embodiments, the release message includes:

a first information element (IE), carrying indication information for indicating the UE to switch from an RRC connected state to the RRC non-connected state; and/or a second IE carrying the positioning assistance information.

The RRC release information is originally intended to be information indicating the UE to release the connection with the base station, to switch from the RRC connected state to the RRC idle state or the RRC inactive state.

In embodiments of the disclosure, the RRC release information also carries the positioning assistance information.

When the RRC release information carries the positioning assistance information, the indication information indicating the UE to switch from the RRC connected state to the RRC non-connected state and the positioning assistance information may be indicated by different parts of the same IE, or by different IEs separately.

In embodiments of the disclosure, the indication information and the positioning assistance information in the RRC release message have different IEs. In this way, the RRC release message includes at least two IEs, i.e., the first IE and the second IE. Independent IEs can facilitate encoding and decoding of both the sender and the receiver.

In some embodiments, the RRC release message may use the original reserved sequence to indicate the positioning assistance information.

In some embodiments, the method further includes:

in response to the positioning assistance information being invalid, performing the positioning measurement in the RRC connected state.

For example, in response to the positioning assistance information being invalid, performing the positioning measurement in the RRC connected state include: switching from the RRC non-connected state to the RRC connected state; and performing the positioning measurement in the RRC connected state after switching to the RRC connected state.

In an embodiment of the disclosure, performing the positioning measurement after switching to the RRC connected state may include performing the positioning measurement according to the positioning assistance information in the RRC connected state.

In another embodiment, performing the positioning measurement in the RRC connected state includes:

sending an obtaining request after switching to the RRC connected state;

receiving the positioning assistance information re-sent based on the obtaining request;

performing the positioning measurement based on the re-sent positioning assistance information; and reporting the measurement result of the positioning measurement.

In some embodiments, the method further includes:

initiating a random access request in response to the positioning assistance information being invalid, in which the random access request carries indication information for obtaining the positioning assistance information;

receiving a random access response returned based on the random access request, in which the random access response carries the re-sent positioning assistance information;

performing the positioning measurement based on the re-sent positioning assistance information; and reporting the measurement result of the positioning measurement in the random access process while maintaining the RRC non-idle state.

For example, the positioning assistance information being invalid includes: the receiving time of the positioning request being not within the valid time range, and/or the UE being outside the valid space range when receiving the positioning request.

In this case, the UE still wants to maintain in the RRC non-connected state for the positioning measurement. In the RRC non-connected state, a random access process will be initiated. The random access process can be described as a 2-step random access process or a 4-step random access process. In the case of a 2-step random access process, the UE can carry an indication to re-acquire the positioning assistance information in the random access message (MsgA). In this way, the base station will re-send the positioning assistance information to the UE upon receiving the MsgA, and at the same time, the base station and/or the UE will end the random access process. If it is a 4-step random access process, the UE can carry an indication to re-acquire the positioning assistance information in the random access message (Msg1 or Msg3). In this way, the base station will re-send the positioning assistance information to the UE upon receiving the Msg2 or Msg4, and at the same time, the base station and/or the UE ends the random access process. By ending the random access process early, the UE will remain in the RRC non-connected state, so as not to switch to the RRC connected state with high energy consumption, thereby reducing the power consumption of the UE and prolonging the standby time of the UE.

Figure 5A:
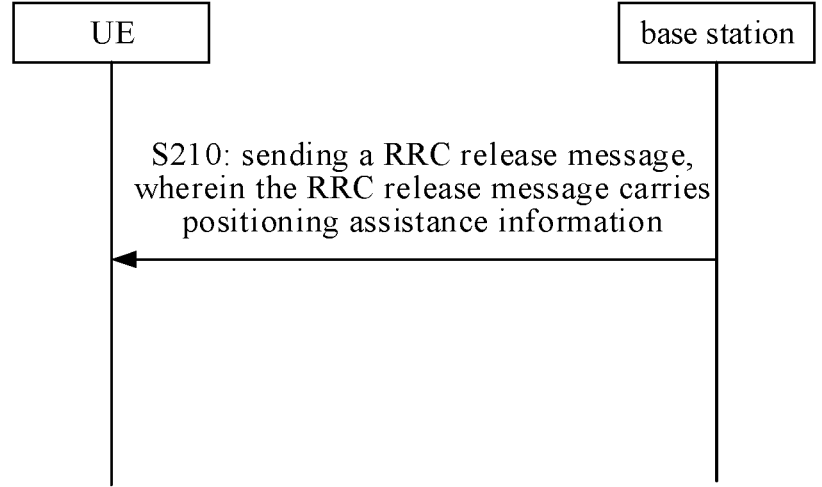
FIG. 5A is a flowchart of another positioning method according to an exemplary embodiment.

As illustrated in FIG. 5A, this embodiment provides a positioning method, applied to a base station. The method includes:

S210, sending a RRC release message, in which the RRC release message carries positioning assistance information, the positioning assistance information is configured to perform positioning measurement when a UE is in an RRC non-connected state, and the RRC non-connected state includes an RRC idle state and an RRC inactive state.

When the UE is in the RRC non-connected state, the UE may or may not receive a positioning request. However, if the UE receives the positioning request when the UE is in the RRC non-connected state, the positioning result may be obtained by positioning based on the positioning assistance information.

Figure 5B:
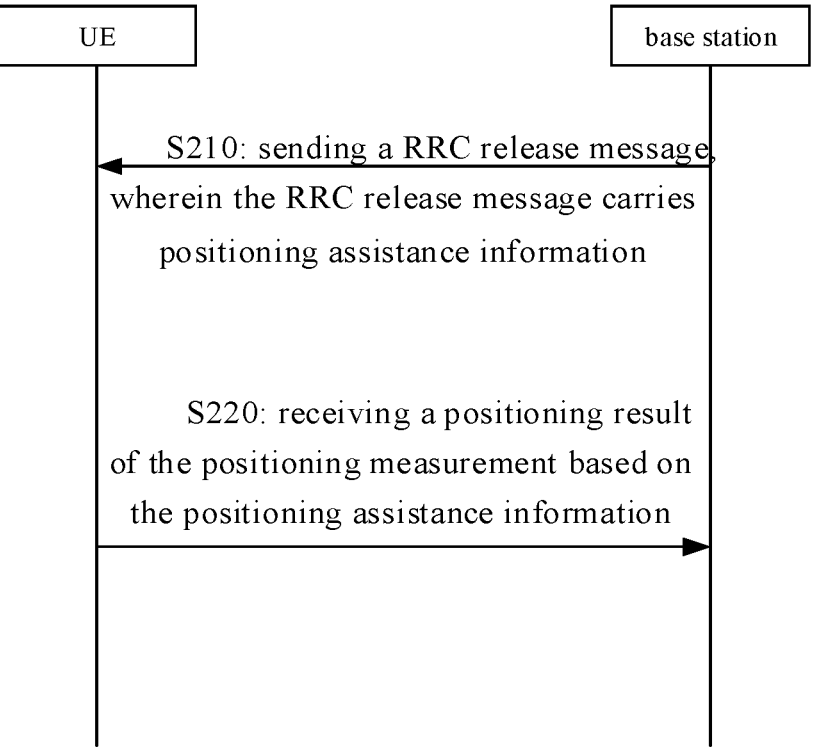
FIG. 5B is a flowchart of another positioning method according to an exemplary embodiment.

As illustrated in FIG. 5B, the method further includes:

S220, receiving a positioning result of the positioning measurement based on the positioning assistance information.

In embodiments of the disclosure, when the base station sends the RRC release message to the UE, it also carries the positioning assistance information simultaneously. In this way, after receiving the RRC release message, the UE switches from the RRC connected state to the RRC non-connected state according to the RRC release message. In addition, when the UE receives the positioning request in the RRC non-connected state, the UE will perform the positioning measurement based on the positioning assistance information, so that the base station will receive the positioning result of the positioning measurement performed by the UE based on the positioning request.

In some embodiments, the method further includes:

receiving a positioning request from the LMF; and sending the paging message carrying the positioning request to the UE by broadcasting. The positioning result is the positioning result obtained and reported from the measurement based on the positioning assistance information: after the UE receives the paging message of the positioning request.

In some embodiments, S220 includes:

receiving the positioning result of the positioning measurement based on the positioning assistance information in response to the positioning assistance information being valid.

The positioning assistance information has a certain time limit and/or valid space range, and the positioning result is obtained by measurement based on the valid positioning assistance information.

For example, the positioning assistance information being valid includes:

a current time being within a valid time range of the positioning assistance information;

and/or the UE being located within a valid space range of the positioning assistance information.

In some embodiments, the current time being within the valid time range of the positioning assistance information includes: the current time being within a time period of the timer started by the UE.

The UE being located within the valid space range of the positioning assistance information includes: a cell where the UE resides being a cell within the valid space range of the positioning assistance information. The cells in the valid space range can be indicated by the cell IDs included in the cell ID list.

In some embodiments, the method further includes: receiving the positioning result of the positioning measurement after the UE switches to the RRC connected state in response to the positioning assistance information being invalid.

In some embodiments, the method further includes: receiving an obtaining request sent after the UE switches to the RRC connected state; and re-sending the positioning assistance information based on the obtaining request.

Receiving the positioning result of the positioning measurement after the UE switches to the RRC connected state when the positioning assistance information is invalid, includes:

receiving the positioning result of the positioning measurement based on the re-sent positioning assistance information by the UE in the RRC connected state when the positioning assistance information is invalid.

In some embodiments, the method further includes:

receiving a random access request sent by the UE when the positioning assistance information is invalid, in which the random access request carries indication information for obtaining the positioning assistance information;

returning a random access response based on the random access request, in which the random access response carries the re-sent positioning assistance information; and receiving a positioning result obtained based on the re-sent positioning assistance information.

For example, the positioning assistance information includes at least one of the followings:

measurement configuration of PRS for performing the positioning measurement;

cell public parameter configuration for performing the positioning measurement;

valid time range indication information configured to indicate the valid time range of the positioning assistance information; and valid space range indication information configured to indicate the valid space range of the positioning assistance information.

In some embodiments, the release message includes:

a first IE, carrying indication information for indicating the UE to switch from a connected state to the RRC non-connected state;

and/or a second IE carrying the positioning assistance information.

For example, for the UE in the RRC idle state or in the RRC inactive state, the positioning assistance information can be obtained by reading the positioning system message or actively requesting the base station to broadcast the positioning system message. For this implementation, there is a problem that the system overhead is too large and the positioning delay is increased.

Embodiments of the disclosure provide a method for configuring positioning assistance information for a UE in an RRC idle state or an RRC inactive state, that is, the base station pre-configures the positioning assistance information for the UE when the UE switches from the RRC connected state to the RRC idle state or the RRC inactive state, and the UE uses the pre-configured positioning assistance information in the RRC idle state or the RRC inactive state. During the positioning measurement, when the UE switches from the RRC connected state to the RRC idle state or the RRC inactive state, the serving base station configures the positioning assistance information in the RRC release message, in which the positioning assistance information is used for the positioning measurement when the UE switches to the RRC idle state or the RRC inactive state. The content of the positioning assistance information sent by the above RRC release message includes the following contents:

positioning measurement assistance information mainly including information required for different positioning technologies to perform the positioning measurement, such as the configuration of positioning reference information of the serving cell and neighboring cells, the configuration of cell public parameters and other information necessary for measurement;

valid time range indication information of the positioning assistance information used to indicate the valid time of the positioning assistance information to the UE, such as a timer, in which when the timer is timed out, the positioning assistance information is invalid;

valid space range indication information of the positioning assistance information used to indicate the valid range of the positioning assistance information to the UE, for example, a cell ID set.

In detail, an IE may be added to the RRC release message to indicate the above positioning assistance information; or for the UE switching to the RRC inactive state, a new IE may be added to the SuspendConfig IE in the RRC release message to indicate the above positioning assistance information.

When the UE is in the RRC idle state or the RRC inactive state, if the UE receives the positioning request sent by the network, according to the positioning assistance information received in the above RRC release message, if the timer is not timed out and the cell where the UE is located is within the valid range of the positioning assistance information, the UE completes the measurement required for positioning according to the positioning assistance information, and reports the measurement result or the position information.

When the UE is in the RRC idle state or the RRC inactive state, if the UE receives the positioning request sent by the network, according to the positioning assistance information received in the above RRC release message, if the timer is not timed out or the cell where the UE is located is beyond the valid range of the positioning assistance information, the UE initiates the random access process, switches to the RRC connected state, requests the positioning assistance information in the RRC connected state, completes the measurement required for positioning, and reports the measurement result or the position information.

When the UE in the RRC idle state or the RRC inactive state switches to the RRC connected state for any reason, for example, the UE switches to the RRC connected state due to the invalidation of the positioning assistance information, and then switches from the RRC connected state to the RRC idle state or the RRC inactive state, if the UE has a positioning requirement, the base station configures the positioning assistance information through the RRC release message, to complete the update of the positioning assistance information of the UE. The positioning requirement can be determined by whether there is a response to the positioning request issued by the LMF. If there is a response, it indicates that there is a positioning requirement, otherwise, there is no positioning requirement.

When the UE switches from the RRC connected state to the RRC idle state or the RRC inactive state, the base station configures the UE with the positioning assistance information through the RRC release message, and adds a new IE to the message.

The behavior of the UE after receiving the above message is defined, that is, when the UE in the RRC idle state or the RRC inactive state receives the positioning request, it firstly determines whether the positioning assistance information is valid. If it is valid, the positioning measurement is performed, otherwise, the UE switches to the RRC connected state to re-obtain the positioning assistance information.

Figure 6:
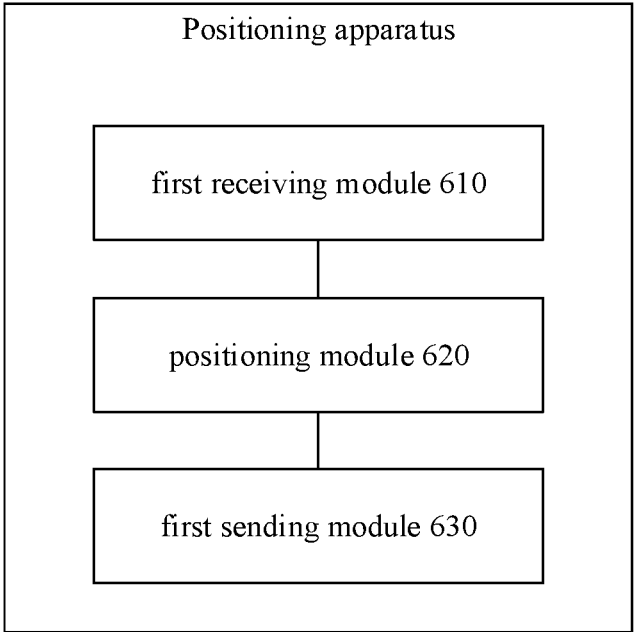
FIG. 6 is a schematic diagram of a positioning apparatus according to an exemplary embodiment.

As illustrated in FIG. 6, this embodiment provides a positioning apparatus, applied to a UE. The apparatus includes:

a first receiving module 610, configured to receive a RRC release message, in which the RRC release message carries positioning assistance information, the positioning assistance information is configured to perform positioning measurement to obtain a positioning result when the UE is in an RRC non-connected state, and the RRC non-connected state includes an RRC idle state and an RRC inactive state.

In some embodiments, the apparatus further includes: a positioning module 620, configured to, in response to receiving a positioning request when the UE is in the RRC non-connected state, perform the positioning measurement based on the positioning assistance information in the RRC non-connected state, in which the RRC non-connected state includes the RRC idle state and the RRC inactive state; and a first sending module 630, configured to report the positioning result of the positioning measurement.

In some embodiments, the first receiving module 610, the positioning module 620 and the first sending module 630 may be program modules. After the program modules are executed by the processor, the functions of the above modules can be implemented.

In other embodiments, the first receiving module 610, the positioning module 620 and the first sending module 630 may be modules composed of both software and hardware, which include various programmable arrays. The programmable array includes: field programmable array or complex programmable array.

In yet other embodiments, the first receiving module 610, the positioning module 620 and the first sending module 630 may be pure hardware modules, which include but not limited to, application-specific integrated circuits.

In some embodiments, the positioning module 620 is configured to determine whether the positioning assistance information is valid in response to receiving the positioning request when the UE is in the RRC non-connected state; and in response to the positioning assistance information being valid, perform the positioning measurement in the RRC non-connected state.

In some embodiments, the valid positioning request is a positioning request received by the UE in the RRC non-connected state when the UE is within the valid time range of the positioning assistance information; and/or, the valid positioning request is a positioning request received by the UE in the RRC non-connected state when the UE is within the valid space range of the positioning assistance information. For example, the positioning module 620 is configured to, in response to receiving the positioning request when the UE is in the RRC non-connected state, determine whether the current time is within the valid time range of the positioning assistance information; and/or, in response to receiving the positioning request when the UE is in the RRC non-connected state, determine whether the UE is located within the valid space range of the positioning assistance information.

In some embodiments, the positioning module 620 is configured to, in response to receiving the positioning request when the UE is in the RRC non-connected state, determine that the positioning assistance information is valid if a timer for timing the valid time range is not timed out; or, determine that the positioning assistance information is invalid if the timer is timed out. For example, the positioning module 620 is configured to, in response to receiving the positioning request when the UE is in the RRC non-connected state, determine whether the timer used to time the valid time range at the current time is timed out; if the timer is not timed out, determine that the positioning assistance information is valid; or, if the timer is timed out, determine that the positioning assistance Information is invalid.

In some embodiments, the positioning module 620 is configured to, in response to receiving the positioning request when the UE is in the RRC non-connected state, determine that the positioning assistance information is valid if a cell where the UE resides is a cell within the valid space range; or, determine that the positioning assistance information is invalid if the cell where the UE resides is not in the valid space range. For example, the positioning module 620 is configured to, in response to receiving the positioning request when the UE is in the RRC non-connected state, determine whether a cell where the UE resides belongs to cells within the valid space range; determine that the positioning assistance information is valid if the cell where the UE resides is the cell in the valid space range; or, determine that the positioning assistance information is invalid if the cell where the UE resides is not the cell in the valid space range.

In some embodiments, the positioning assistance information includes at least one of the followings:

measurement configuration of PRS for performing the positioning measurement;

cell public parameter configuration for performing the positioning measurement;

valid time range indication information configured to indicate the valid time range of the positioning assistance information; and valid space range indication information configured to indicate the valid space range of the positioning assistance information.

In some embodiments, the release message includes:

a first IE, carrying indication information for indicating the UE to switch from a connected state to the RRC non-connected state;

and/or a second IE carrying the positioning assistance information.

In some embodiments, the apparatus further includes:

a switching module, configured to, in response to the positioning assistance information being invalid, switch from the RRC non-connected state to the connected state.

The positioning module 620 is configured to perform the positioning measurement in the RRC connected state after switching to the RRC connected state.

Figure 7:
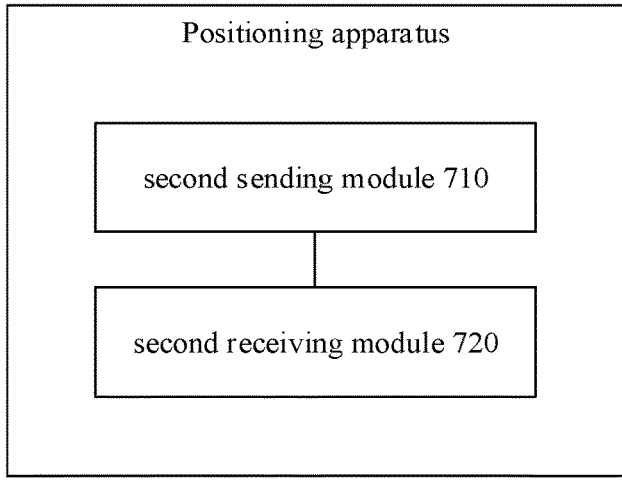
FIG. 7 is a schematic diagram of a positioning apparatus according to an exemplary embodiment.

As illustrated in FIG. 7, this embodiment provides a positioning apparatus, applied to a base station. The apparatus includes:

a second sending module 710, configured to send a RRC release message, in which the RRC release message carries positioning assistance information, the positioning assistance information is configured to perform positioning measurement when a UE is in an RRC non-connected state, and the RRC non-connected state includes an RRC idle state and an RRC inactive state.

In some embodiments, the apparatus further includes:

a second receiving module 720, configured to receive a positioning result of the positioning measurement based on the positioning assistance information.

In some embodiments, the second sending module 710 and the second receiving module 720 may be program modules. After the program modules are executed by the processor, the functions of the above modules can be implemented.

In some embodiments, the second sending module 710 and the second receiving module 720 may be modules composed of both software and hardware, which include various programmable arrays. The programmable array includes: field programmable array or complex programmable array.

In some embodiments, the second sending module 710 and the second receiving module 720 may be pure hardware modules, which include but not limited to, application-specific integrated circuits.

In some embodiments, the second receiving module 720 is configured to receive the positioning result of the positioning measurement based on the positioning assistance information in response to the positioning assistance information being valid.

In some embodiments, the positioning assistance information being valid includes:

a current time being within a valid time range of the positioning assistance information;

and/or the UE being located within a valid space range of the positioning assistance information.

In some embodiments, the current time being within the valid time range of the positioning assistance information includes:

the current time being within a timing range of a timer for timing the valid time range in the UE;

and/or the UE being located within the valid space range of the positioning assistance information includes:

a cell where the UE resides being a cell within the valid space range of the positioning assistance information.

In some embodiments, the second receiving module 720 is configured to:

receive the positioning result of the positioning measurement after the UE switches to the RRC connected state in response to the positioning assistance information being invalid.

In some embodiments, the positioning assistance information includes at least one of the followings:

measurement configuration of PRS for performing the positioning measurement;

cell public parameter configuration for performing the positioning measurement;

valid time range indication information configured to indicate the valid time range of the positioning assistance information; and valid space range indication information configured to indicate the valid space range of the positioning assistance information.

In some embodiments, the release message includes:

a first IE, carrying indication information for indicating the UE to switch from a connected state to the RRC non-connected state;

and/or a second IE carrying the positioning assistance information.

Embodiments of the disclosure provides a communication device, including a processor, a transceiver, a memory, and executable programs stored in the memory and capable of being run by the processor. When the processor runs the executable programs, any of a positioning method applied in a base station or a positioning method applied in a terminal provided in any of the above technical solutions is implemented.

The communication device may be the aforementioned base station or terminal.

The processor may include various types of storage medium, which are non-transitory computer storage medium that can continue to memorize information stored thereon after the communication device is powered down. Here, the communication device includes a base station or a UE.

The processor can be connected to the memory through a bus, for reading the executable programs stored on the memory, for example, at least one of one or more methods shown in FIG. 2, FIG. 3A, FIG. 3B, FIG. 4, FIG. 5A and FIG. 5B. The embodiment of the disclosure provides a computer storage medium, where executable programs are stored in the computer storage medium. After the executable programs are executed by a processor, any of the positioning method applied to a base station or the positioning method applied to a terminal provided in the foregoing technical solutions is implemented.

The embodiments of the disclosure provide a computer-readable storage medium on which executable programs are stored. When the executable programs are executed by a processor, any of the positioning method applied to a base station or the positioning method applied to a terminal provided in the foregoing technical solutions is implemented, for example, one or more of the methods shown in FIG. 2, FIG. 3A, FIG. 3B, FIG. 4, FIG. 5A and FIG. 5B.

Figure 8:
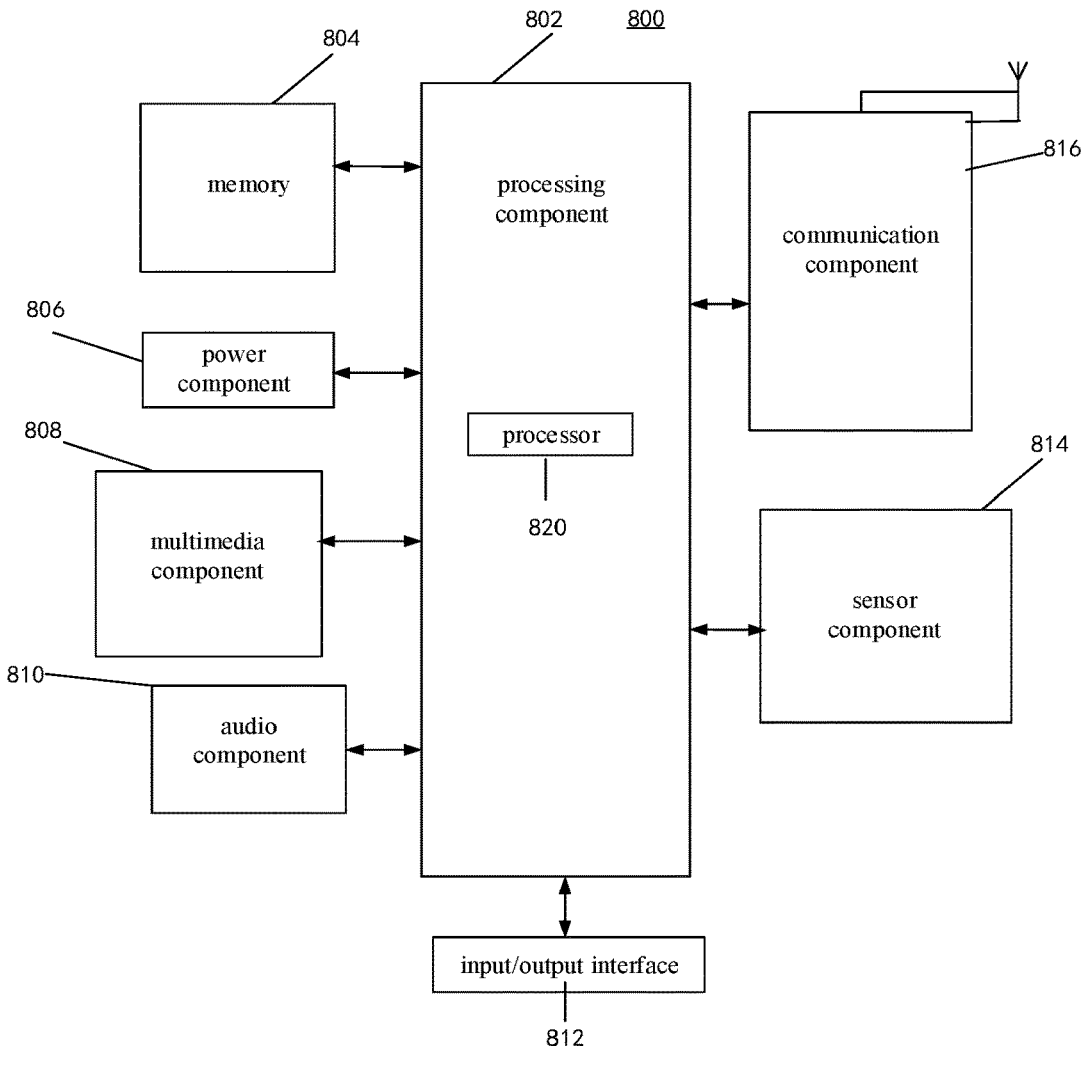
FIG. 8 is a schematic diagram of a terminal according to an exemplary embodiment.

FIG. 8 is a block diagram of a terminal (UE) 800 according to an exemplary embodiment. For example, the terminal 800 may be a mobile phone, a computer, a digital broadcasting terminal, a message transceiver device, a game console, a tablet device, a medical device, a fitness device and a personal digital assistant.

As illustrated in FIG. 8, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the terminal 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic components, for performing the above described method.

In exemplary embodiments, there is also provided a non-transitory computer readable storage medium including instructions, such as included in the memory 804, executable by the processor 820 in the terminal 800, for performing the above method. For example, non-transitory computer-readable storage medium may be a ROM, a RAM, a CD-ROM, a magnetic tape, a floppy disc, an optical data storage device, and the like.

Figure 9:
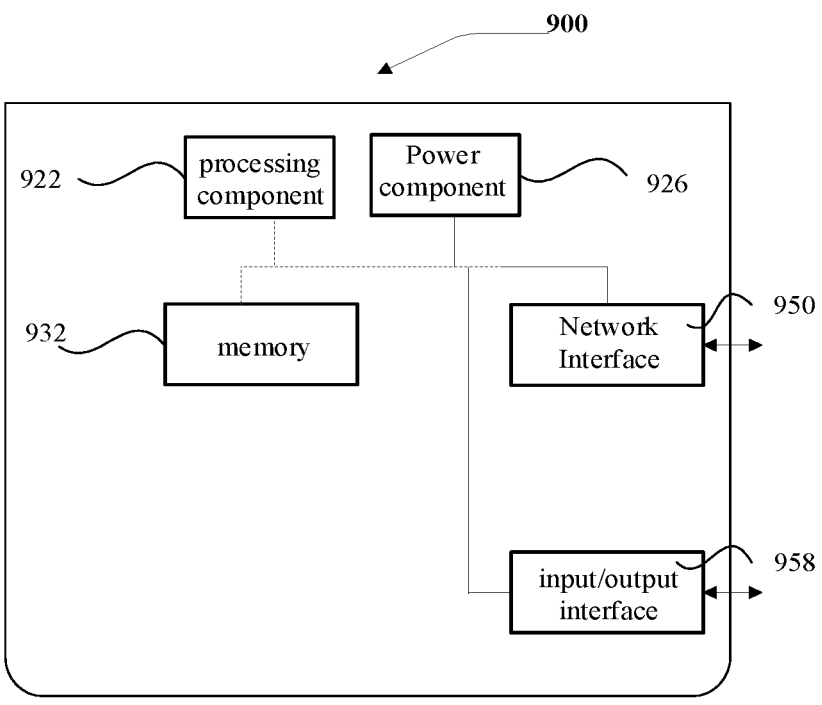
FIG. 9 is a schematic diagram of a base station according to an exemplary embodiment.

As illustrated in FIG. 9, an embodiment of the disclosure shows a structure of a base station. For example, the base station 900 may be provided as a network-side device. As illustrated in FIG. 9, the base station 900 includes a processing component 922, which further includes one or more processors, and a memory resource represented by a memory 932 for storing instructions executable by the processing component 922, such as application programs.

The application program stored in the memory 932 may include one or more modules, each module being corresponding to a set of instructions. In addition, the processing component 922 is configured to execute instructions to perform the above method applied to the base station.

The base station 900 may also include a power component 926 configured to perform power management of the base station 900, a wired or wireless network interface 950 configured to connect the base station 900 to the network, and an input/output (I/O) interface 958. The base station 900 may operate based on an operating system stored on the memory 932, such as Windows Server™, Mac OS X™, Unix™, Linux™, FreeBSD™ or the like.

According to the technical solution of embodiments of the disclosure, when the UE enters in the RRC non-connected state such as RRC idle state or RRC inactive state, the positioning assistance information is received from the RRC release message, so that the UE does not need to intentionally receive the positioning assistance information from the system message or the request-based system message, thereby reducing signaling overhead. Meanwhile, when the UE is in the RRC non-connected state, once a positioning request is received, the UE can directly perform the positioning measurement based on the positioning assistance information received in the RRC release message in the RRC non-connected state, so as to obtain the positioning result, and report the positioning result to the base station in the RRC non-connected state. In this way, the UE does not need to switch to the RRC connected state, and then obtain the positioning assistance information required for the positioning measurement by receiving the system message sent by the base station or the request-based system message, thereby reducing the positioning delay and improving the positioning rate. Furthermore, the UE does not need to switch from the RRC non-connected state to the RRC connected state with high energy consumption only for the positioning measurement, thereby reducing the unnecessary long time that the UE is in the RRC connected state, thereby saving the power consumption of the UE and reducing power consumption caused by the UE frequently switching between RRC disconnected state and RRC connected state.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only.

It will be appreciated that the disclosure is not limited to the exact construction that has been described above and illustrated in the accompanying drawings, and that various modifications and changes can be made without departing from the scope thereof.

What is claimed is:

1. A positioning method, comprising:
   in response to receiving a positioning request, determining whether positioning assistance information is valid; and
   in response to the positioning assistance information being valid, performing a positioning measurement, wherein a user equipment, UE, is in a radio resource control, RRC, non-connected state;
   wherein determining whether positioning assistance information is valid comprises at least one of:

determining whether a current time is within the valid time range of the positioning assistance information; or determining whether the UE is located within a valid space range of the positioning assistance information.

2. The method of claim 1, wherein determining whether the UE is located within the valid space range of the positioning assistance information comprises:

determining that the positioning assistance information is valid if a cell where the UE resides is a cell within the valid space range.

3. The method of claim 1, wherein determining whether the UE is located within the valid space range of the positioning assistance information comprises:

determining that the positioning assistance information is invalid when the cell where the UE resides is not within the valid space range.

4. The method of claim 1, wherein the positioning assistance information comprises at least one of:

measurement configuration of a positioning reference signal being used to indicate resource location information of the positioning reference signal;

cell public channel configuration for performing the positioning measurement;

valid time range indication information configured to indicate the valid time range of the positioning assistance information; and valid space range indication information configured to indicate the valid space range of the positioning assistance information.

5. A UE comprising a processor, a transceiver, a memory, and executable programs stored on the memory and capable of being executed by the processor, wherein when the processor runs the executable programs, the processor is configured to:

determine whether positioning assistance information is valid in response to receiving a positioning request; and perform a positioning measurement in response to the positioning assistance information being valid, wherein the UE is in the a radio resource control, RRC, non-connected state;

wherein the processor is further configured to determine whether positioning assistance information is valid by at least one of:

determining whether a current time is within the valid time range of the positioning assistance information; or determining whether the UE is located within a valid space range of the positioning assistance information.

6. The UE of claim 5, wherein the processor is further configured to determine whether the UE is located within the valid space range of the positioning assistance information by:

determining that the positioning assistance information is valid if a cell where the UE resides is a cell within the valid space range.

7. The UE of claim 5, wherein the processor is further configured to determine whether the UE is located within the valid space range of the positioning assistance information by:

determining that the positioning assistance information is invalid when the cell where the UE resides is not within the valid space range.

8. The UE of claim 5, wherein the positioning assistance information comprises at least one of:

measurement configuration of a positioning reference signal being used to indicate resource location information of the positioning reference signal;

cell public channel configuration for performing the positioning measurement;

valid time range indication information configured to indicate the valid time range of the positioning assistance information; and valid space range indication information configured to indicate the valid space range of the positioning assistance information.

9. A non-transitory computer-readable storage medium having executable programs stored thereon, wherein when the executable programs are executed by a processor, implement following steps:

in response to receiving a positioning request, determining whether positioning assistance information is valid; and in response to the positioning assistance information being valid, performing a positioning measurement, wherein a user equipment, UE, is in a radio resource control, RRC, non-connected state;

wherein determining whether positioning assistance information is valid comprises at least one of:

determining whether a current time is within the valid time range of the positioning assistance information; or determining whether the UE is located within a valid space range of the positioning assistance information.

10. The non-transitory computer-readable storage medium of claim 9, wherein determining whether the UE is located within the valid space range of the positioning assistance information comprises:

determining that the positioning assistance information is valid if a cell where the UE resides is a cell within the valid space range.

11. The non-transitory computer-readable storage medium of claim 9, wherein determining whether the UE is located within the valid space range of the positioning assistance information comprises:

determining that the positioning assistance information is invalid when the cell where the UE resides is not within the valid space range.

12. The non-transitory computer-readable storage medium of claim 9, wherein the positioning assistance information comprises at least one of:

measurement configuration of a positioning reference signal being used to indicate resource location information of the positioning reference signal;

cell public channel configuration for performing the positioning measurement;

valid time range indication information configured to indicate the valid time range of the positioning assistance information; and valid space range indication information configured to indicate the valid space range of the positioning assistance information.

* * * * *